(12) United States Patent
Grimminger et al.

(10) Patent No.: US 8,194,633 B2
(45) Date of Patent: *Jun. 5, 2012

(54) METHOD FOR TRANSMITTING DATA IN A WLAN NETWORK

(75) Inventors: Jochen Grimminger, Munich (DE); Dirk Kroselberg, Munich (DE); Hannes Tschofenig, Munich (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/958,591

(22) Filed: Dec. 2, 2010

(65) Prior Publication Data

US 2011/0134776 A1 Jun. 9, 2011

Related U.S. Application Data

(62) Division of application No. 10/546,403, filed as application No. PCT/DE2003/004196 on Dec. 18, 2003, now Pat. No. 7,873,348.

(30) Foreign Application Priority Data

Feb. 28, 2003 (DE) .................................. 103 08 933

(51) Int. Cl.
    *H04W 4/00* (2009.01)
(52) U.S. Cl. ............ 370/338; 726/17; 726/21; 709/225; 380/270; 713/155
(58) Field of Classification Search .................. 455/410, 455/411; 726/17, 21; 370/338; 709/225; 713/155; 380/270
See application file for complete search history.

(56) References Cited

U.S. PATENT DOCUMENTS

| 6,608,832 B2 | 8/2003 | Forslow |
| 6,788,676 B2 | 9/2004 | Partanen et al. |
| 2004/0148425 A1 | 7/2004 | Haumont et al. |
| 2004/0203732 A1 | 10/2004 | Brusilovsky et al. |
| 2006/0233140 A1 | 10/2006 | Grimminger et al. |

FOREIGN PATENT DOCUMENTS

| CN | 1399490 | 2/2003 |
| CN | 1757198 A | 4/2006 |
| CN | 100417109 C | 9/2008 |
| WO | 03/030445 A1 | 4/2003 |

OTHER PUBLICATIONS

J. Arkko, V. Tovinen, A. Niemi, INTERNET—DRAFT: draft-torvinen-http-eap-01.txt Nov. 2001.
Cisco Systems Inc., Extensible Authentication Protocol Transport Layer Security Deployment Guide for Wireless LAN Networks, 1992-2002.
J. Rosenberg, H. Schutzrinne, G. Camarillo, A. Johnston, J. Peterson, R. Sparks, M. Handley, E. Schooler, "SIP: Session Initiation Protocol" Network Working Group, Jun. 2002, http://www.ietf.org/rfc/rfc3261.txt pp. 1-269.

(Continued)

*Primary Examiner* — Vladimir Magloire
(74) *Attorney, Agent, or Firm* — Buchanan Ingersoll & Rooney PC

(57) ABSTRACT

A method for transmitting data in a Wireless Local Area Network (WLAN) including transmitting a WLAN message between a terminal device and an access node of the WLAN network in the Layer 2 protocol layer. An Extensible Authentication Protocol (EAP) message is transmitted in the WLAN message. The EAP message includes a Session Initiation Protocol (SIP) message having SIP authentication data.

18 Claims, 2 Drawing Sheets

OTHER PUBLICATIONS

3GPP TS 24.228 Version 5.0.0, 3rd Generation Partnership Project; Technical Specification Group Core Network; Signalling flows for the IP multimedia call control based on SIP and SDP; Stage 3 (Release 5), Mar. 2002, http://www.3gpp.org, pp. 1-690.

Aki Niemi, "Authentication: Authorization and Accounting in Session Initiation Protocol Networks" Thesis Heisinki University of Technology, Mar. 7, 2002, pp. 1-76.

Ericsson, "Proposal to use a generic authentication scheme for SIP" 3GPP TSG WG3 S3#18, Agenda Item 9.3, Phoenix, Arizona, May 21-24, 2001, pp. 1-8, XP-002276255.

C. Rigney, S. Willens, A. Rubens, W. Simpson, "Remote Authentication Dial in User Service (RADIUS)", Network Working Group, http://www.ietf.org/rfc/rfc2865.txt, Jun. 2000, pp. 1-76.

M. Handley, V. Jacobson, "SDP: Session Description Protocol", Network Working Group, RFC 2327, Apr. 1998, pp. 1-42.

L. Blunk, J. Vollbrect, "PPP Extensible Authentication Protocol (EAP)" Network Working Group, RFC 2284, HTTP://www.ieft.org/rfc/rfc2284.txt; Mar. 1998, pp. 1-15.

C. Ntantogian, C. Xenakis, I. Stavrakakis, "Efficient Authentication for Users Autonomy in Next Generation All-IP Networks".

B. Aboba, D. Simon, "PPP EAP TLS Authentication Protocol" Network Working Group, RFC 2716, http://www.ietf.org/rfc/rfc2716; Oct. 1999, pp. 1-23.

B. Aboba, L. Blunk, J. Vollbrecht, J. Carlson, H. Levkowetz, "Extensible Authentication Protocol" Network Working Group, RFC 3748, http://www.ietf.org/rfc/rfc3748; Jun. 2004, pp. 1-63.

http://en.wikipedia.org/wiki/Extensible_Authentication_Protocol.

http://searchnetworking.techtarget.com/sDefinition/0,,sid7...gci212060.—html.

http://dictionary.reference.com/browse/encapsulate.

METHOD FOR TRANSMITTING DATA IN A WLAN NETWORK

CROSS REFERENCE TO RELATED APPLICATIONS

This application is a divisional of U.S. patent application Ser. No. 10/546,403, filed Aug. 19, 2005, which is the U.S. National Stage of International Application No. PCT/DE2003/004196, filed Dec. 18, 2003, and claims the benefit thereof. The International Application claims the benefits of German Application No. 10308933.0, filed Feb. 28, 2003. All applications are incorporated by reference herein in their entirety.

BACKGROUND OF THE INVENTION

1. Field of the Invention

The invention relates to a method for transmitting data in a WLAN network, a corresponding device for transmitting such data, and a corresponding data network.

2. Description of the Related Art

The transmission of data via wireless local area networks (WLANs) has become more and more widely established over the last several years. WLAN stands for "Wireless Local Area Network" and denotes a local wireless network with ranges of several hundred meters. Nowadays, users of terminal devices, in particular of mobile radio devices and laptops, have the opportunity to-register at any locations in commercially operated WLAN networks. With this arrangement the user can locate a plurality of WLAN networks via his or her terminal device, each WLAN network comprising what are known as access nodes (usually referred to as "access points") via which the user can obtain access to further data networks, in particular to the internet or to UMTS networks.

A variety of methods for authenticating a user at the access node of a WLAN network are known from the prior art. In the WLAN standard IEEE 802.1x, for example, the EAP protocol (EAP=Extensible Authentication Protocol, see document [1]) known from the PPP environment (PPP=Point-to-Point Protocol) is used. Authentication mechanisms already known from the prior art, for example USIM or AKA, are in turn used in the EAP protocol.

A disadvantage that reveals itself in the case of the authentication mechanisms used in the WLAN environment is that the said mechanisms are not very flexible and with them it is essentially only possible to transmit authentication data without more extensive information.

The object of the invention is therefore to provide a method for transmitting data in a WLAN network which provides an improved authentication in further data networks that are connected to the WLAN network.

This object is achieved by the claims.

SUMMARY OF THE INVENTION

In the method according to the invention, WLAN messages are transmitted between a terminal device and an access node of the WLAN network in the L2 protocol layer, whereby EAP messages containing SIP messages with SIP authentication data (SIP=Session Initiation Protocol) are transmitted in the WLAN messages. The SIP protocol is sufficiently well known from the prior art (see [2]) and is used in IP-based networks for initializing a protocol session. In this context the term SIP includes both the currently used SIP protocols and SIP protocols that are presently in the process of development, such as, for example, SIPng (=SIP next generation). By integrating SIP authentication data in the EAP messages it is possible not only for an authentication to take place in a WLAN network, but also for authentication procedures to be performed in all networks connected to the WLAN network, provided said networks are able to process the SIP protocol. Since a multiplicity of data networks, in particular all IP-based data networks, understand the SIP protocol, the method according to the invention enables an authentication to be carried out in a multiplicity of networks.

The invention is based in particular on the knowledge that the relevant part in the message exchange is congruent in EAP and SIP authentication, so the exchange can be performed synchronously and in coupled form. In this scheme the SIP protocol is used as the transport layer that is embedded between the EAP protocol and an authentication mechanism. The authentication mechanism used in the EAP protocol is thereby replaced by a SIP authentication mechanism. A further advantage of the method according to the invention is that the outdated RADIUS protocol (see [3]) which is commonly used in IP-based networks can be dispensed with for the authentication and newer mechanisms can be used in its place.

In a preferred embodiment, the SIP authentication data is generated using an authentication mechanism chosen from Kerberos, Digest, AKA, USIM, etc. All the said authentication mechanisms are sufficiently well known from the prior art, so this description will not deal in further detail with these mechanisms.

In another preferred embodiment, one or more SIP Proxy CSCF servers (CSCF=Call State Control Function) are used in order to process the SIP authentication data. Said servers are well known from the prior art and are able to process the SIP authentication data and perform a corresponding authentication.

In a further preferred embodiment, the SIP messages additionally contain SDP messages (SDP=Session Description Protocol). The SDP protocol is likewise well known from the prior art (see document [4]) and is used for describing protocol sessions in IP-based networks. In this context the term SDP includes both the currently used SDP protocols and SDP protocols that are presently in the process of development, such as, for example, SDPng (=SDP next generation).

In a further preferred embodiment, the WLAN messages contain specific messages concerning possible data connections of the terminal device via the access node to networks that can be connected to the WLAN network. In this case the specific messages are in particular contained at least in part in the SDP messages mentioned in the foregoing. This enables inquiries relating to possible data connections to be addressed via the WLAN protocol to the access node or, as the case may be, to networks connected to the access node so that it can be clarified in advance whether a data connection desired by the user of the terminal device is possible at all or, alternatively, which data connections can be set up at all via the WLAN network.

The specific messages preferably contain inquiries and/or information in relation to one or more data connection types and/or qualities of data connection and/or data connection costs and/or services provided by the data connection. The user of the terminal device is therefore provided with a multiplicity of decision criteria according to which he or she can specify his or her desired data connection.

In another preferred embodiment, the specific messages are evaluated and, depending on the results of the evaluation, it is decided whether the data connection is possible or, as the case may be, which data connection of the terminal device via the access node will be used for data transmission to networks that can be connected to the WLAN network. The desired data connection can thus be provided to the user of the terminal device automatically or, alternatively, the user can be informed that the data connection required for his or her purposes is not possible at all via the WLAN network. The specific messages are preferably evaluated in the SIP Proxy CSCF servers already mentioned in the foregoing.

In another preferred embodiment, the WLAN messages conform to the WLAN standard IEEE 802.11. Furthermore, the networks that can be connected to the WLAN network preferably include one or more 3GPP and/or IP networks.

In addition to the above described transmission method according to the invention, the invention also comprises a device for transmitting data in a WLAN network, the device including: [0017] an access node, whereby WLAN messages can be transmitted in the L2 protocol layer (L2=Layer 2) between the access node and a terminal device and EAP messages can be transmitted in the WLAN messages, said EAP messages containing SIP messages with SIP authentication data; [0018] a computing unit connected to the access node (AP) for the purpose of evaluating the SIP authentication data.

In another preferred embodiment of the device according to the invention, the computing unit comprises an SIP Proxy CSCF server. Moreover, the computing unit is preferably integrated in the access node.

In addition, the invention comprises a data network with a WLAN network and one or more data networks that can be connected to the WLAN network, the data network being embodied in such a way that the above described method according to the invention can be performed.

Exemplary embodiments of the invention are described below with reference to the attached drawings.

DETAILED DESCRIPTION OF THE INVENTION

Figure 1:
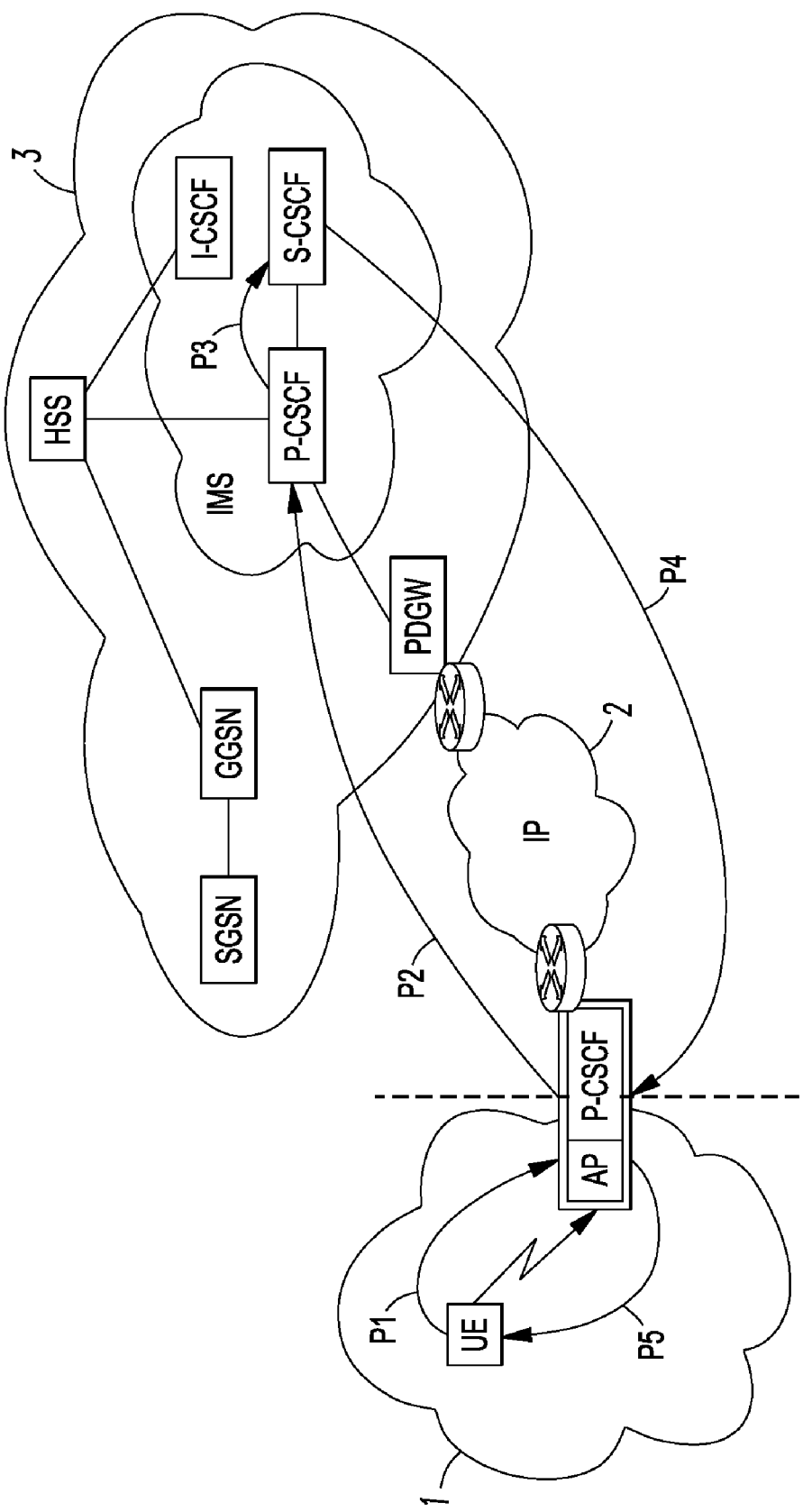
FIG. 1 is the schematic representation of a data network in which the data transmission method according to the invention can be performed.

The data network represented schematically in FIG. 1 comprises a WLAN network 1, an IP network 2 and a 3GPP network 3. A user terminal device UE (User Equipment), which can be, for example, a mobile radio device or a laptop, is wirelessly connected (as indicated by the zigzag arrow) to an access node AP (AP=Access Point) of the WLAN network. The access node AP is in turn connected to a Proxy CSCF server P-CSCF. Servers of said kind are already well known from the prior art and are used for processing SIP/SDP messages.

An IP network 2 is connected to the access node AP or, as the case may be, to the P-CSCF server P-CSCF. Said IP network is in turn connected to a 3GPP network 3. The 3GPP network comprises a plurality of components with the designations SGSN, GGSN, HSS, IMS, P-CSCF, I-CSCF, S-CSCF and PDGW. The components identified by these abbreviations are universally known building blocks of a 3GPP network and the terms hidden behind the abbreviations are generally known to the person skilled in the art. Since the structure of the 3GPP network plays no significant role insofar as the method according to the invention is concerned, this structure will not be dealt with in any further detail below.

Suffice it to mention that the IP network is connected to the 3GPP network via the gateway PDGW.

In the method according to the invention, WLAN messages are exchanged in the L2 protocol layer between the user terminal device UE and the access node AP, with EAP messages being transmitted in the WLAN messages, said EAP messages in turn containing SIP messages with SIP authentication data. Said SIP messages are generated without an IP address being assigned. In this case use is made of the fact that the EAP protocol provides a tunnel for generic authentication mechanisms. Said tunnel is used in turn to transport SIP authentication data which enables an authentication to be performed at the SIP Proxy CSCF server connected to the access node AP. The authentication data can additionally be transmitted to further computers in the IP network 2 or, as the case may be, in the 3GPP network 3 so that an authentication can also be performed at more remote computers. This is indicated in FIG. 1 by the arrows P1, P2, P3, P4 and P5, which represent a data flow for authentication of the terminal device UE at the computer S-CSCF of the 3GPP network 3. Generally it will be clear from the contents of the SIP messages which server is responsible for authentication for the terminal device UE and the server in question will be addressed via the SIP messages.

Since SIP authentication data can be processed in all three networks 1, 2 and 3, the SIP protocol can be used as the sole protocol for authentication in the networks 1, 2 and 3. In this case mechanisms already well known from the prior art, such as, for example, Kerberos, Digest, AKA, USIM and suchlike, will be used in particular as authentication mechanisms. A particular advantage of the method is that authentication by means of the outdated RADIUS protocol can be dispensed with in the IP network 2. While it is true that the so-called Diameter protocol already exists as the successor to the RADIUS protocol, the Diameter protocol is not very widely established. In contrast thereto, the SIP protocol is a very commonly used protocol in networks, more particularly also in 3GPP networks.

In the exemplary embodiment of the method according to the invention described here, the SIP messages additionally contain SDP messages in which are stored inquiries or information concerning possible data connections of the terminal device UE via the access node AP to the IP network and/or the 3GPP network.

These inquiries or information can include in particular an access request which is specified by the user of the terminal device. For example, the access request can concern the type of data connection by means of which a data transmission is to take place via the access node. The user can, for example, specify that the data connection is to be set up via the internet. An inquiry of said kind can also relate to a bandwidth desired by the user or to a delay or jitter of the data connection. It is therefore possible to choose the provider, for example in unfamiliar foreign networks, according to predefined criteria.

Figure 2:
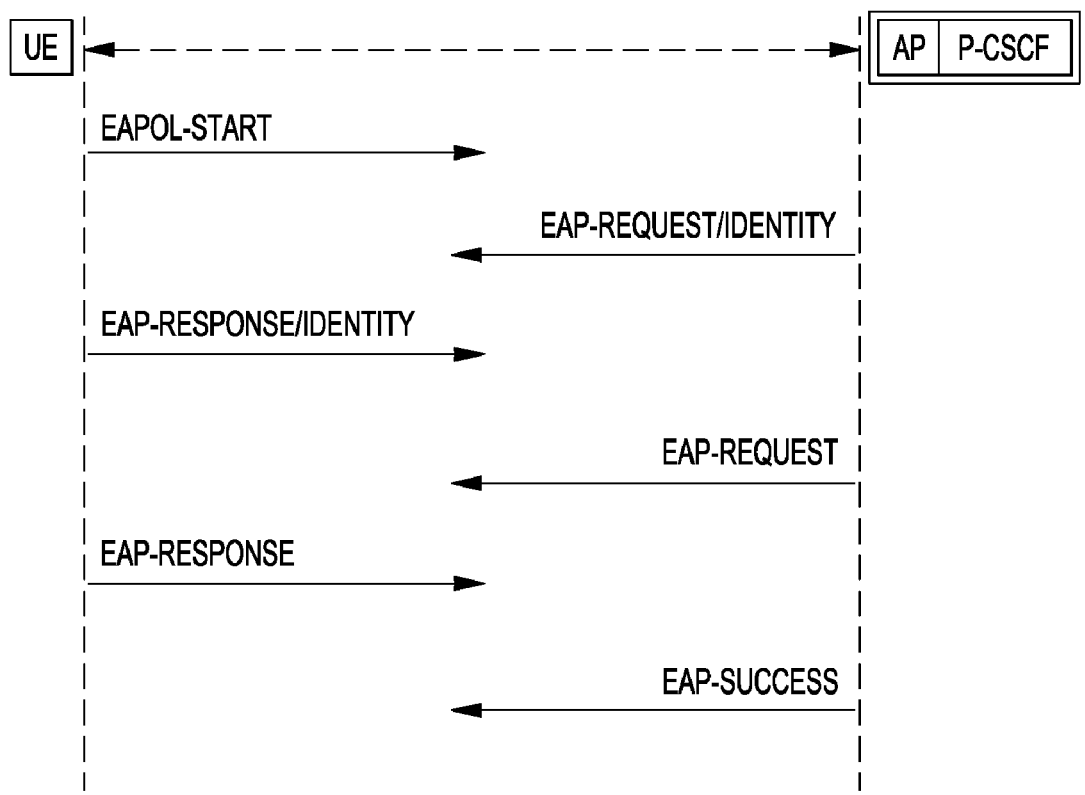
FIG. 2 is a schematic diagram illustrating the transmission of messages by means of the EAP protocol.

The way in which the authentication according to the invention is performed by means of the EAP protocol is illustrated in an exemplary manner in FIG. 2. First, an EAPOL-Start message is sent by the user terminal device UE to the access node AP and the P-CSCF server connected to the access node. Next, an EAP-Request/Identity message is sent to the terminal device UE by the access node. These first two messages are used to initialize the EAP protocol. The actual authentication is then performed through the exchange of four further messages, designated as EAP-Response/Identity, EAP-Request, EAP-Response and EAP-Success. According to the inventive method, SIP authentication data of the SIP protocol is transported in the EAP protocol, with known authentication mechanisms being used in turn in said SIP protocol.

While we have shown and described certain present preferred embodiments of our method for transmitting data in a WLAN network, it is to be distinctly understood that the invention is not limited thereto but may be otherwise variously embodied and practiced within the scope of the following claims.

REFERENCES

Internet Engineering Task Force (IETF) Request For Comments (RFC) 2284, 3261, 2865, and 2327.

The invention claimed is:

1. A method for transmitting data in a Wireless Local Area Network (WLAN), comprising:
   transmitting a WLAN message between a terminal device and an access node of the WLAN network in the Layer 2 protocol layer; and
   wherein a Extensible Authentication Protocol (EAP) message is transmitted in the WLAN message, the EAP message comprises a Session Initiation Protocol (SIP) message having SIP authentication data; and
   wherein the WLAN message comprises a message concerning a data connection of the terminal device via the access node to at least one network that is connectable to the WLAN network; and
   evaluating the message concerning the data connection of the terminal device;
   determining whether the data connection is possible; and
   determining which data connection of the terminal device via the access node will be used for a data transmission to the at least one network that is connectable to the WLAN network.

2. The method as claimed in claim 1, wherein the SIP authentication data is generated using an authentication mechanism, the authentication mechanism being selected from the group consisting of Kerberos, Digest, AKA, and USIM.

3. The method as claimed in claim 1, wherein the SIP authentication data is evaluated in a SIP Proxy Call State Control Function (CSCF) server.

4. The method as claimed in claim 2, wherein the SIP authentication data is evaluated in a SIP Proxy CSCF server.

5. The method as claimed in claim 1, wherein the SIP message of the EAP message also comprises a Session Description Protocol (SDP) message.

6. The method as claimed in claim 2, wherein the SIP message of the EAP message also comprises a SDP message.

7. The method as claimed in claim 3, wherein the SIP message of the EAP message also comprises a SDP message.

8. The method as claimed in claim 1 wherein the message concerning the data connection of the terminal device via the access node to the at least one network that is connectable to the WLAN network is at least partially stored in a SDP message.

9. The method as claimed in claim 1 wherein the message concerning the data connection of the terminal device is at least partially stored in a SDP message.

10. The method as claimed in claim 1 wherein the message concerning the data connection of the terminal device comprises at least one of: inquiries relating to one or more data connection types, information relating to one or more data connection types, qualities of data connection, data connection costs, and services provided by the data connection.

11. The method as claimed in claim 1 wherein the step of evaluating the message concerning the data connection of the terminal device occurs in a SIP Proxy CSCF server.

12. The method as claimed in claim 1, wherein the WLAN message conforms with the WLAN standard IEEE 802.11.

13. The method as claimed in claim 1, further comprising transmitting a message between the access node and an IP network or a 3rd Generation Partnership Project (3GPP) network connectable to the access node or the WLAN network such that the IP network or the 3GPP network receives the SIP authentication data and evaluates the SIP authentication data.

14. A data network comprising a WLAN network and a network that can be connected to the WLAN network, wherein the data network is such that the method of claim 1 can be performed.

15. The method of claim 1 wherein the SIP authentication data at least partially defines an authentication mechanism and wherein the access node is an access point.

16. A device for transmitting data in a Wireless Local Area Network (WLAN), comprising:
   an access node; and
   a computing unit connected to the access node for evaluating SIP authentication data; and
   wherein a WLAN message is transmittable between the access node and a terminal device in a Layer 2 protocol layer; and
   wherein an EAP message can be transmitted in the WLAN message, the EAP message comprises an SIP message that has SIP authentication data; and
   wherein the WLAN message comprises a message concerning a data connection of the terminal device via the access node to at least one network that is connectable to the WLAN network; and
   wherein the computing unit or the access node evaluating the message concerning the data connection of the terminal device;
   wherein the computing unit or the access node determining whether the data connection is possible; and
   wherein the computing unit or the access node determining which data connection of the terminal device via the access node will be used for a data transmission to the at least one network that is connectable to the WLAN network.

17. The device as claimed in claim 16, wherein the computing unit comprises a SIP Proxy CSCF server.

18. The device as claimed in claim 16, wherein the computing unit is integrated in the access node.

* * * * *